United States Patent
Baeumler et al.

(10) Patent No.: US 12,435,788 B2
(45) Date of Patent: Oct. 7, 2025

(54) MOTOR VEHICLE HAVING A COUPLING MECHANISM AND A PARKING LOCK DEVICE

(71) Applicant: Bayerische Motoren Werke Aktiengesellschaft, Munich (DE)

(72) Inventors: Richard Baeumler, Munich (DE); Klaus Zelger, Taufkirchen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 18/716,184

(22) PCT Filed: Jan. 30, 2023

(86) PCT No.: PCT/EP2023/052184
§ 371 (c)(1),
(2) Date: Jun. 4, 2024

(87) PCT Pub. No.: WO2023/160954
PCT Pub. Date: Aug. 31, 2023

(65) Prior Publication Data
US 2025/0035210 A1    Jan. 30, 2025

(30) Foreign Application Priority Data
Feb. 23, 2022   (DE) ..................... 10 2022 104 217.0

(51) Int. Cl.
*F16H 63/34* (2006.01)
(52) U.S. Cl.
CPC ..... *F16H 63/3466* (2013.01); *F16H 63/3425* (2013.01)
(58) Field of Classification Search
CPC .......................... F16H 63/3466; F16H 63/3425
See application file for complete search history.

(56) References Cited

U.S. PATENT DOCUMENTS

| 5,704,457 A | 1/1998 | Kimura et al. |
| 6,746,354 B1 | 6/2004 | Ziemer |

(Continued)

FOREIGN PATENT DOCUMENTS

| CN | 112460250 A | * | 3/2021 | ............. F16H 59/02 |
| CN | 112728064 A | * | 4/2021 | ............. F16H 59/02 |

(Continued)

OTHER PUBLICATIONS

International Search Report (PCT/ISA/210) issued in PCT Application No. PCT/EP2023/052184 dated Mar. 13, 2023 with English translation (6 pages).

(Continued)

*Primary Examiner* — Bobby Rushing, Jr.
(74) *Attorney, Agent, or Firm* — Crowell & Moring LLP (57) ABSTRACT

A vehicle comprising at least one electric drive machine and a coupling mechanism switchable between a coupling position, where the electric drive machine is coupled to a drive wheel so as to transmit torque, and a decoupling position where the electric drive machine is decoupled from the wheel. A parking lock device has a parking lock element movable between a parking lock position, where the parking lock element blocks a rotation of the wheel, and an unlocking position in which the parking lock element releases rotation of the wheel. An actuation device comprises an actuator to actuate a clutch of the coupling mechanism, said clutch having a switching element pretensioned by spring force on a housing of the coupling mechanism and used to switch between the coupling position and the decoupling position, and which moves the parking lock element between the parking lock position and the unlocking position.

11 Claims, 5 Drawing Sheets

(56) References Cited

U.S. PATENT DOCUMENTS

| 12,060,917 | B2 * | 8/2024 | Qiu | ............... F16H 63/04 |
|---|---|---|---|---|
| 2013/0199887 | A1 | 8/2013 | Kassler et al. | |
| 2021/0207710 | A1 | 7/2021 | Schmidt et al. | |
| 2024/0301952 | A1 * | 9/2024 | Hou | ............... F16H 63/304 |

FOREIGN PATENT DOCUMENTS

| CN | 112780768 A * | 5/2021 | ........... F16H 63/304 |
|---|---|---|---|
| DE | 199 23 316 A1 | 11/2000 | |
| DE | 20 2005 019 438 U1 | 4/2007 | |
| DE | 10 2011 100 060 A1 | 11/2011 | |
| DE | 10 2011 088 669 A1 | 6/2013 | |
| DE | 10 2014 221 056 A1 | 4/2016 | |
| DE | 102018133269 A1 * | 6/2020 | ............. F16H 61/32 |
| DE | 102019127313 B3 * | 2/2021 | ............. F16H 63/08 |
| DE | 10 2020 210 677 A1 | 2/2022 | |
| WO | WO 2018/095544 A1 | 5/2018 | |
| WO | WO 2020/001778 A1 | 1/2020 | |
| WO | WO-2021207885 A1 * | 10/2021 | ............. F16D 11/02 |

OTHER PUBLICATIONS

German-language Written Opinion (PCT/ISA/237) issued in PCT Application No. PCT/EP2023/052184 dated Mar. 13, 2023 with English translation (10 pages).

German-language Search Report issued in German Application No. 10 2022 104 217.0 dated Aug. 7, 2023 with partial English translation (10 pages).

German-language Office Action issued in German Application No. 10 2022 104 217.0 dated Sep. 28, 2022 (6 pages).

\* cited by examiner

MOTOR VEHICLE HAVING A COUPLING MECHANISM AND A PARKING LOCK DEVICE

BACKGROUND AND SUMMARY

This disclosure relates to a motor vehicle having at least one electric drive machine, for driving the motor vehicle, having at least one coupling mechanism which can be switched at least between a coupling position, in which the electric drive machine is coupled to a drive wheel of the motor vehicle in a torque-transmitting manner, and a decoupling position, in which the electric drive machine is decoupled from the drive wheel, and having a parking lock device which comprises at least one parking lock element which can be displaced between a parking lock position, in which the at least one parking lock element at least indirectly blocks a rotation of the drive wheel, and an unlocking position, in which the at least one parking lock element releases the rotation of the drive wheel.

Such coupling mechanisms make it possible, for example, to interrupt torque transmission between the electric drive machine and drive wheels of a motor vehicle as required (decoupling position) and thus, for example, to allow so-called coasting of the motor vehicle in its driving mode, and also to produce the torque transmission (coupling position) in order to allow the drive wheels to be driven by way of the drive machine.

By contrast, parking lock devices allow motor vehicles to be secured against rolling away in their parked state. For this purpose, a pawl of the parking lock device typically engages in a parking lock wheel of the parking lock device in a form-fitting manner.

DE 199 23 316 A1 describes, for example, a drive system for a motor vehicle having a starter and generator unit arranged in a drivetrain with a drive shaft. The starter and generator unit has an electric machine, which can be operated as an electric motor with starter function or as an electric generator, and a planetary gear mechanism.

It is an object of the present disclosure to provide a motor vehicle having a coupling mechanism and a parking lock device which can be operated in an improved manner.

The disclosure is based on a motor vehicle having at least one electric drive machine, for driving the motor vehicle. The motor vehicle further comprises at least one coupling mechanism which can be switched at least between a coupling position, in which the electric drive machine is coupled to a drive wheel of the motor vehicle in a torque-transmitting manner, and a decoupling position, in which the electric drive machine is decoupled from the drive wheel. Moreover, the motor vehicle comprises a parking lock device which comprises at least one parking lock element which can be displaced between a parking lock position, in which the at least one parking lock element at least indirectly blocks a rotation of the drive wheel, and an unlocking position, in which the at least one parking lock element releases the rotation of the drive wheel. The coupling mechanism can preferably be able to be switched in an automated manner between the coupling position and the decoupling position.

According to the disclosure, there is provision that the motor vehicle comprises at least one actuating device with an actuator which is designed, on the one hand, to actuate a clutch of the coupling mechanism, which clutch has at least one switching element, preloaded by spring force on a housing of the coupling mechanism, and serves for switching between the coupling position and the decoupling position, and is designed, on the other hand, to displace the at least one parking lock element between the parking lock position and the unlocking position. This is advantageous since, by way of the actuating device, on the one hand the clutch can thus be actuated and as a result the switching between the coupling position and the decoupling position can be brought about, and, on the other hand, by way of this actuating device, the displacement between the parking lock position and the unlocking position can also be brought about. The actuating device is thus assigned at least a dual function, with the result that the motor vehicle can be operated in an improved manner, namely with particularly low control complexity and low structural complexity. Furthermore, weight can be saved in particular by comparison with systems known from the prior art. The motor vehicle can, for example, comprise a control device by way of which, for example, the actuating device can be controllable. In the present case, the expression "drive wheel" can be understood to mean a drive element which has direct contact with a contact surface of the motor vehicle and accordingly can have at least a rim and a tire connected thereto.

The disclosure is based on the finding that, in systems known from the prior art, a plurality of functions also require the use of a corresponding number of servo motors, this being associated with increased complexity for controlling the respective servo motors to perform the functions. The disclosure comes in here and allows improved control, in particular improved operation, of the motor vehicle by way of both the clutch and the parking lock element being actuated by the actuating device.

The expression "between the coupling position and the decoupling position" can be understood to mean that the actuating device can indeed be designed and used both for switching from the coupling position into the decoupling position and for (reversed) switching from the decoupling position into the coupling position. However, this does not have to be the case. The expression "between the coupling position and the decoupling position" can also encompass the fact that either the switching from the coupling position into the decoupling position or the switching from the decoupling position into the coupling position occurs by way of the actuating device.

This also applies analogously to the displacement of the parking lock element between the parking lock position and the unlocking position. The actuating device can be designed and used both for displacing from the parking position into the unlocking position and vice versa, that is to say from the unlocking position into the parking position. However, it is also conceivable that the actuating device can be designed and used either for displacing the parking lock element from the parking lock position into the unlocking position or vice versa, from the unlocking position into the parking position.

The actuator can thus be used and arranged both for actuating the switching element and for displacing the parking lock element. For this purpose, the actuator can, on the one hand, be coupled at least indirectly to the switching element and, on the other hand, at least indirectly to the parking lock element in a force-transmitting manner.

In the context of the present disclosure, the actuator can particularly preferably be designed as an electric motor. The electric motor can, with particularly low complexity, be supplied with electrical energy from an electrical system of the motor vehicle.

Also conceivable in principle, however, is a configuration of the actuator as a pneumatic device or as a hydraulic device, with the result that, for example, the actuation of the clutch and the displacement between the parking lock position and the unlocking position can be brought about by supplying the actuator with compressed air or hydraulic liquid. The configuration of the actuator as a pneumatic device (pneumatically operating device) or as a hydraulic device (hydraulically operating device) can be advantageous in order to allow actuation and/or emergency actuation of the switching element and of the parking lock element that is independent of an electrical energy store, and thus of the electrical system of the motor vehicle, and that is thus particularly fail-safe, by virtue of the pneumatic device or hydraulic device being supplied with energy, for example, via a corresponding pressure accumulator.

Preferably, the actuator can be designed to generate a rotary movement, oriented in particular in precisely one direction of rotation, by way of which it is possible for both the clutch to be actuated and the parking lock element to be displaced. By contrast with a linear movement, such a rotary movement allows particularly space-saving actuation or displacement.

The clutch can be switched by way of the switching element. The switching element thus makes it possible, for example, for at least one clutch element of the clutch to be moved relative to another clutch element of the clutch and as a result for the clutch to be switched.

The clutch can preferably be designed as a positive clutch. By positive clutch is to be understood a clutch in which, in the coupling position, a transmission of torque occurs by positive inter-engagement, that is to say by positive locking of the respective clutch elements of the clutch. As opposed to clutches which transmit torque by frictional engagement, that is to say friction clutches, such as, for example, multi-plate clutches or slip clutches, it is advantageous in the case of positive clutches that no holding force is necessary in order to maintain the transmission of the torque. Moreover, in positive clutches, there also occurs no slip between the respective clutch elements via which torque can be transmitted, or is transmitted, in the coupling position. This contributes to an increase in efficiency and makes it possible overall to achieve a low-complexity operation of the coupling mechanism and thus also of the motor vehicle.

Preferably, the torque-transmitting coupling between the electric drive machine and the drive wheel can be produced exclusively by switching from the decoupling position into the coupling position. There can thus be provision that the motor vehicle comprises no further clutches which are interposed between the drive wheel and the electric drive machine for torque transmission.

Advantageously, the electric drive machine in the coupling position can be coupled to the drive wheel via the at least one coupling mechanism without any differential gear mechanism, that is to say in other words without a differential gear mechanism of the motor vehicle being interposed and consequently in a torque-transmitting manner without any differential gear mechanism. The electric drive machine can thus be coupled to the drive wheel via the coupling mechanism for single wheel drive of the drive wheel.

Preferably, there can be provision that the motor vehicle comprises a plurality of drive wheels, coupling mechanisms and electric drive machines. Thus, each of the drive wheels can be assigned at least one coupling mechanism and at least one electric drive machine. If the motor vehicle thus has, for example, a four-wheel drive, the motor vehicle can comprise four drive wheels, four electric drive machines and four coupling mechanisms. It is possible in this way, for example, for the respective front drive wheels, which are assigned to a front end, that is to say the front of the motor vehicle, to be decoupled by switching the (front) coupling mechanisms assigned to these front drive wheels and setting the decoupling position, whereas the rear drive wheels, which are assigned to a rear end, that is to say the rear of the motor vehicle, are coupled by switching the (rear) coupling mechanisms and setting the coupling position and are thus used for driving the motor vehicle. In this exemplary case, the front drive wheels are in a so-called "coasting mode" and, by contrast to the rear drive wheels, are not used for driving the motor vehicle. It is of course also conceivable that the front drive wheels are used for driving the motor vehicle and the rear drive wheels are in coasting mode.

Particularly preferably, the coupling mechanism can be designed as a gear stage, in particular an intermediate gear stage, which can be switched between the coupling position and the decoupling position. This allows simple integration into a transmission, in particular a spur gear transmission, of the motor vehicle. The transmission can preferably be configured as an automatic transmission. The coupling mechanism can thus preferably be integrated into a spur gear transmission of the motor vehicle. This is advantageous since the coupling mechanism can thereby be arranged in a particularly installation space-saving manner and received in a housing of the spur gear transmission. Preferably, the coupling mechanism can be designed as an intermediate gear stage of the spur gear transmission.

The fact that the switching element is preloaded by spring force on the housing of the coupling mechanism means that a particularly quick movement of the switching element, that is to say a particularly rapid, and thus low-delay, switching of the clutch can be brought about. The reason for this is that, when spring force preloading is applied, an acceleration of the switching element as a result of relaxing of the first spring element and also by driving the switching element by way of the actuator can be brought about.

In an advantageous development of the disclosure, there is provision that the actuating device is designed to set a release state in which the decoupling position is switched and at the same time the parking lock element is held displaced in the unlocking position. This is advantageous since, for example, a so-called "coasting" of the motor vehicle is allowed in the release state. It can thus be ensured that movement energy of the motor vehicle is used for its propulsion, instead of losing at least some of the movement energy through an overrun mode of the electric drive machine. Preferably, the actuator maintains both the decoupling position and at the same time the unlocking position, as a result of which a high degree of operational reliability can be achieved, especially since the actuator can be used for maintaining both positions, that is to say both the decoupling position and the unlocking position.

In a further advantageous development of the disclosure, there is provision that the actuating device is designed to set a drive switching state in which the coupling position is switched and at the same time the parking lock element is held displaced in the unlocking position. This is advantageous since, in the drive switching state, the driving of the motor vehicle is ensured by coupling the electric drive machine to the drive wheel via the coupling mechanism and at the same time the parking lock element is open and thus held in the unlocking position. Preferably, the actuator maintains both the coupling position and at the same time the unlocking position, as a result of which a high degree of operational reliability can be achieved, especially since the actuator can be used for maintaining both positions, that is to say both the coupling position and the unlocking position.

In a further advantageous development of the disclosure, there is provision that the actuating device is designed to set a blocking switching state in which the coupling position is switched and at the same time the parking lock element is held displaced in the parking lock position. This is advantageous since, in the blocking switching state, the drive wheel can be held both by way of the electric drive machine and by way of the parking lock device, with the result that undesired rolling away of the motor vehicle can be avoided in a particularly effective manner. Preferably, the actuator maintains both the coupling position and at the same time the parking lock position, as a result of which a high degree of operational reliability can be achieved, especially since the actuator can be used for maintaining both positions, that is to say both the coupling position and the locking position.

Thus, the release state, the drive switching state or the blocking switching state can be selectively set by way of the actuating device, in particular by way of the actuator of the actuating device. As a result, a particularly high degree of operational reliability can be achieved, especially since it is possible in a particularly effective manner to avoid a situation in which the parking lock device is closed, that is to say the parking lock element is held displaced in the parking lock position and at the same time the decoupling position is switched.

In a further advantageous development of the disclosure, there is provision that the at least one actuating device comprises an actuating element which can be adjusted by way of the actuator and which is designed, on the one hand, to exert at least one switching force on the switching element for actuating the clutch and, on the other hand, for exerting at least one displacing force, for displacing the at least one parking lock element between the parking lock position and the unlocking position. This is advantageous since the actuating element thus performs a dual function, with the result that, in particular, the provision of further actuating elements can be dispensed with and in this way weight can be saved. The actuating element can preferably be formed, at least in certain regions or completely, as a shaft which can be connected to a rotor shaft of the actuator in a rotationally fixed manner or formed as a rotor shaft of the actuator.

Preferably, the switching element can be rotatably connected to the actuating element, in particular rotatably mounted on the actuating element. This is advantageous since the actuating element can thus also be used for mounting the switching element, with the result that a corresponding, additional bearing can be dispensed with and thus weight can be saved.

In a further advantageous development of the disclosure, there is provision that the at least one actuating element is preloaded by spring force at least indirectly via a first spring element of the actuating device on the housing of the coupling mechanism and is coupled at least indirectly, preferably directly, to the at least one switching element of the clutch in a force-transmitting manner. This is advantageous since, when exerting the switching force, the first spring element can be preloaded by way of the actuating element, with the result that the switching force can accordingly act permanently on the switching element. As a result, a particularly low-delay actuation of the clutch can be achieved and consequently, for example, a particularly low-delay switching from the decoupling position into the coupling position can be achieved as soon as this is mechanically possible, for example as a result of rotational speed parity of respective gears of the coupling mechanism. In order to actuate the clutch, the switching force can be exerted on the switching element of the clutch. The switching element can thus be moved and can adjust at least one clutch element of the clutch in order thereby to bring about the switching between the coupling position and the decoupling position.

The spring element can have a spring element region which, for example, can take the form of a spring leg. By way of the spring element region, the first spring element can be preloaded by spring force on the housing at least indirectly, preferably directly. Within the context of the disclosure, the expression "preloaded by spring force" is to be understood to mean that the spring element can be braced between the housing and switching element or the actuating element, as a result of which spring force preloading is then present between the housing and the actuating element or the switching element.

The first spring element can be braced, that is to say preloaded by spring force, between the housing and the switching element and, moreover, the switching element can be coupled at least indirectly to the actuating element in a force-transmitting manner. As a result, the actuating element can be braced with the housing via the first spring element at least indirectly, namely by way of the switching element. The actuating element can thus be preloaded by spring force on the housing via the switching element and the first spring element. It is of particular advantage here that a particularly low-delay movement of the actuating element and of the switching element can be achieved as a result of the spring force preloading via the first spring element. The reason for this is that the actuating element and the switching element can be accelerated both by the spring force preloading and by the actuator. In other words, both the first spring element, through its relaxation, and the actuator can then contribute to the acceleration of the actuating element and of the switching element, as a result of which the particularly low-delay movement is made possible.

The first spring element can be formed as a torsion spring. As a result, a setting of a spring travel of the first spring element as a result of exerting the switching force can occur not only in a particularly space-saving manner, in particular without axial length change. A further advantage is that the actuating element and/or the switching element can be inserted, at least in certain regions, into a spring element opening of the first spring element if the first spring element is formed as a torsion spring. As a result, the actuating element and/or the switching element can perform a further function, namely the function of the particularly captive retention of the first spring element.

In a further advantageous development of the disclosure, there is provision that the at least one actuating element is coupled at least indirectly, preferably directly, to an eccentric element of the actuating device in a force-transmitting manner via a second spring element of the actuating device, by way of which eccentric element the parking lock element can be displaced between the parking lock position and the unlocking position. This is advantageous since, when exerting the displacing force, the second spring element can be preloaded by way of the actuating element, with the result that the displacing force can accordingly act permanently on the eccentric element. As a result, a particularly low-delay actuation of the eccentric element can be achieved and consequently, for example, a particularly low-delay displacement of the parking lock element, for example from the unlocking position into the parking lock position, can be achieved as soon as this is mechanically possible. This can be mechanically possible for example if a rotational speed of a parking lock wheel of the parking lock device has a sufficiently small rotational speed value, with the result that the parking lock element, which can be formed for example as a parking lock pawl, can latch into the parking lock wheel and as a result the parking lock position can be set.

The second spring element can be formed as a torsion spring. As a result, a setting of a spring travel of the second spring element as a result of exerting the displacing force can occur not only in a particularly space-saving manner, in particular without axial length change. A further advantage is that the actuating element and/or the eccentric element can be inserted, at least in certain regions, into a spring element opening of the second spring element if the second spring element is formed as a torsion spring. As a result, the actuating element and/or the eccentric element can perform a further function, namely the function of the particularly captive retention of the second spring element.

Preferably, the eccentric element can be formed as a cam by way of which a large cam stroke for displacing the parking lock element can be implemented just with a small rotation of the cam. Alternatively, the eccentric element can also be formed, for example, as a circular disk which is mounted eccentrically, that is to say outside a center axis of the eccentric element. Such a circular disk cannot only be produced with particularly low complexity, but also allows particularly uniform displacement without sudden travel changes.

In a further advantageous development of the disclosure, there is provision that the actuating element can be rotated in a direction of rotation by way of the actuator, as a result of which both the at least one switching force can be exerted on the switching element via the first spring element and the at least one displacing force can be exerted on the eccentric element via the second spring element. This is advantageous since, during the rotation in the, in particular precisely one, direction of rotation, both the switching element and the eccentric element can thus be actuated. The components involved, in particular the actuating element, the switching element and the eccentric element, are thus tailored and arranged with respect to one another with low complexity and in particular in an operationally reliable manner in such a way that an undesired, or even safety-critical, situation in which, for example, the parking lock element is in the parking lock position and at the same time the decoupling position is set can be ruled out. This contributes to a considerable degree to high operational reliability of the motor vehicle.

In a further advantageous development of the disclosure, there is provision that the actuating element has a switching element stop, by way of which a movement of the switching element relative to the actuating element can be limited, and/or the actuating element has an eccentric element stop, by way of which a movement of the eccentric element relative to the actuating element can be limited. This is advantageous since in this way a particularly low-complexity setting of an end position positioning of the switching element and/or of the eccentric element on the actuating element can be achieved, wherein the switching element can be brought into abutment with the switching element stop and the eccentric element can be brought into abutment with the eccentric element stop. In particular, a rotation of the switching element and/or of the eccentric element relative to the actuating element can be limited by way of the switching element stop and/or the eccentric element stop. The switching element can have a switching element-side stop which interacts with, and thus corresponds to, the switching element stop and which can be in abutment with the switching element stop when limiting the movement of the switching element relative to the actuating element. By contrast, the eccentric element can have an eccentric element-side stop which interacts with, and thus corresponds to, the eccentric element stop and which can be in abutment with the eccentric element stop when limiting the movement of the eccentric element relative to the actuating element.

In a further advantageous development of the disclosure, the coupling mechanism comprises a first gear, which is in at least indirect engagement with the drive machine, and a second gear which can be coupled by way of the clutch to the first gear in a torque-transmitting manner and which is coupled at least indirectly to the drive wheel in a rotationally fixed manner. This is advantageous since the coupling mechanism is thus of particularly simple and robust design and consequently has a particularly low susceptibility to faults. The expression "indirectly" is generally to be understood as meaning that further torque-transmitting elements can be interposed. The respective gear can, for example, be coupled to the drive machine or the drive wheel via a shaft (as such a torque-transmitting element), and thus indirectly. The expression "in a rotationally fixed manner" is generally to be understood as meaning that a relative movement between components coupled to one another in a rotationally fixed manner, for example shaft and gear, is prevented. Furthermore, the clutch comprises a first clutch element which is at least indirectly coupled to the first gear in a rotationally fixed manner via a second clutch element of the clutch which is connected to the first gear in a rotationally fixed manner. This is advantageous since the clutch thus has a particularly simple and robust design. The expression "indirectly" is to be understood as meaning that both the respective clutch element and the respective gear can be connected for example to a corresponding shaft in a rotationally fixed manner, as a result of which the clutch element can then be coupled to the gear indirectly, namely for example by way of the shaft. Furthermore, the clutch comprises a connecting element which, on the one hand, is at least indirectly coupled to the second gear and, on the other hand, can be at least indirectly coupled to the first clutch element in a rotationally fixed manner, in particular by setting the coupling position. This is advantageous since the connecting element allows a particularly simple configuration of the first clutch element. The connecting element can be at least indirectly coupled to the second gear in a reversibly releasable manner, that is to say in other words in a releasable manner without destruction, for example by way of a spline toothing, which can also be referred to as a spline system. The connecting element can preferably be formed as a socket, in particular a fixed socket.

In a further advantageous development of the disclosure, the clutch comprises a locking element. The locking element is designed to prevent the switching from the decoupling position into the coupling position when there is a rotational speed difference between the first gear and the second gear. Moreover, the locking element is designed to release a relative movement, which brings about the switching from the decoupling position into the coupling position, between the first clutch element and the second clutch element when there is rotational speed parity between the first gear and the second gear. Advantageously, the locking element thus prevents excess mechanical loading, in particular mutual striking of the clutch elements, and undesired noise which could otherwise occur during (unintended) switching into the coupling position when there is a rotational speed difference.

In a further advantageous development of the disclosure, there is provision that, in the coupling position and/or in the decoupling position, the switching element is inserted, at least in certain regions, into a gear recess arranged radially within a toothing of at least one of the gears and is in engagement with the first clutch element. This is advantageous since a particularly space-saving arrangement is provided by the switching element being arranged at least in certain regions in the gear recess. The fact that the switching element is in engagement with the first clutch element in the gear recess results in a particularly advantageous force flow with particularly few deflections and accordingly small mechanical stresses and/or loading peaks. Particularly preferably, the first clutch element can be arranged radially within the gear recess both in the coupling position and in the decoupling position, resulting in a correspondingly particularly advantageous arrangement with respect to the force flow. In order to actuate the clutch, the switching force can be exerted for example on the switching element of the clutch and be transmitted to the first clutch element via the switching element. The gear recess can also be referred to as recess of the gear, wherein this recess is situated further inward in the radial direction of extent than the toothing of the gear.

The switching element can have at least a first element arm portion and a second element arm portion which is connected directly to the first element arm portion and encloses an angle with the first element arm portion, wherein one of the element arm portions is inserted into the gear recess and can be coupled to the clutch, and the other element arm portion can be rotatably coupled to the actuating device at least indirectly, preferably directly. This design allows a particularly space-saving actuation of the clutch.

In a further advantageous development of the disclosure, there is provision that the switching element takes the form of a switching rocker or a switching fork. This is advantageous since both switching rockers and switching forks constitute particularly robust forms of switching elements. In order to actuate the clutch, the switching force can be exerted for example on the switching element of the clutch. The switching element can preferably be rotatably coupled to the actuating device, in particular rotatably mounted on the actuating device.

The features and combinations of features stated above in the description and also the features and combinations of features stated below in the description of the figures and/or shown alone in the figures can be used not only in the respectively specified combination but also in other combinations or in isolation without departing from the scope of the disclosure.

Further advantages, features and details of the disclosure will result from the claims, the following description of preferred embodiments and from the drawings.

DETAILED DESCRIPTION OF THE DRAWINGS

In the following, identical and functionally identical elements are provided with the same reference signs.

Figure 1:
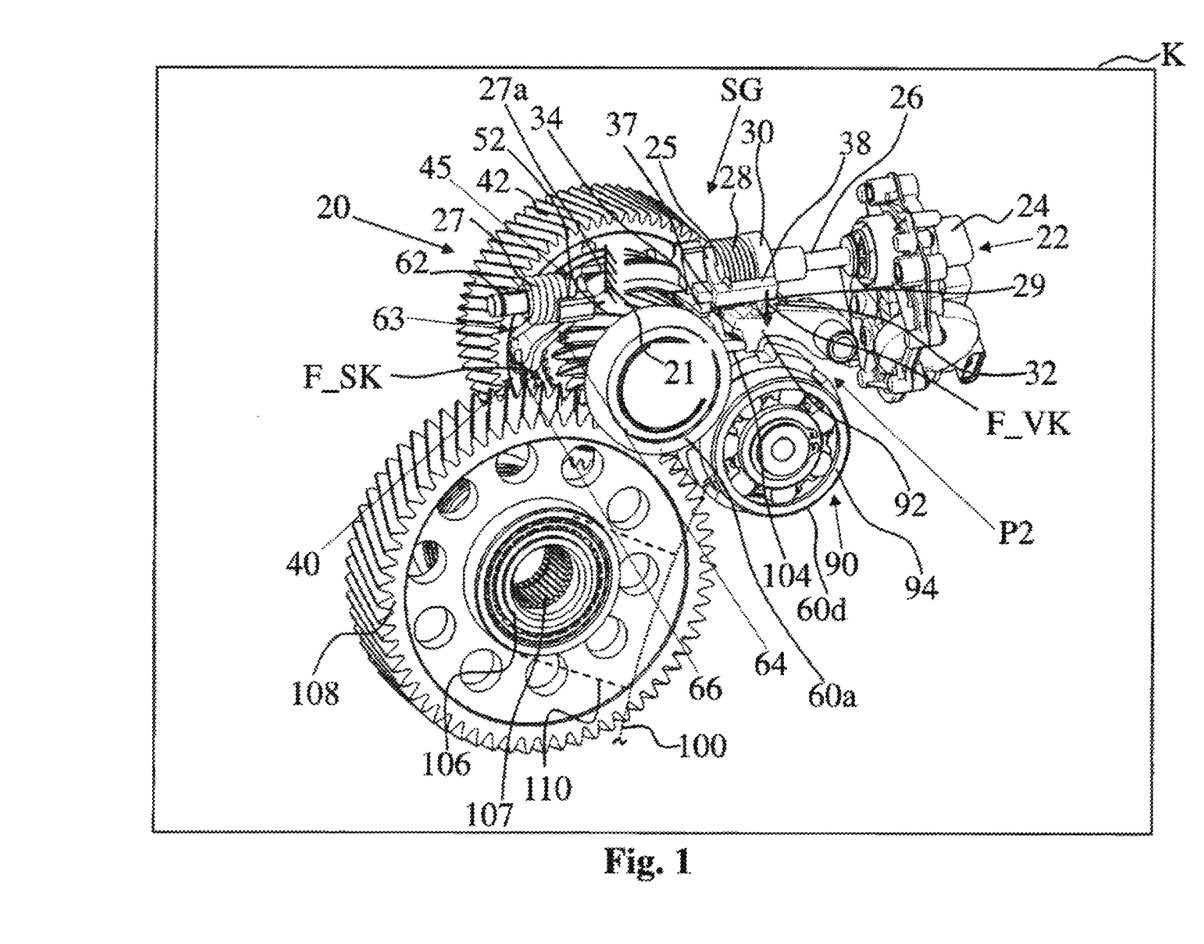
FIG. 1 shows a schematic perspective view of a spur gear transmission which comprises a coupling mechanism and is coupled to an electric drive machine which serves for driving a drive wheel of a motor vehicle (which is represented in a greatly abstracted manner), wherein the motor vehicle comprises a parking lock device, a clutch for switching the coupling mechanism and an actuating device.

FIG. 1 is a schematic perspective view showing a motor vehicle K which comprises electric drive machines 10, spur gear transmissions SG with coupling mechanisms 20 and drive wheels 100. Each of the spur gear transmissions SG is assigned one of the coupling mechanisms 20. In other words, in each case one of the coupling mechanisms 20 is integrated into in each case one of the spur gear transmissions SG of the motor vehicle K.

Each of the drive machines 10 is coupled to in each case one of the spur gear transmissions SG. Each of the spur gear transmissions SG can moreover be coupled to in each case one of the drive wheels 100 in that the respective coupling mechanism 20 of the respective spur gear transmission SG is switched from a decoupling position ES into a coupling position KS. The decoupling position ES and the coupling position KS can be seen by way of example in FIG. 3. In the coupling position KS, the respective drive wheel 100 is coupled to the respective drive machine 10 in a torque-transmitting manner, whereas the torque transmission between the drive wheel 100 and drive machine 10 is interrupted in the decoupling position ES. In other words, the respective electric drive machine 10 is decoupled from the respective drive wheel 100 in the decoupling position ES of the respective coupling mechanism 20. This makes it possible overall to achieve selective driving of the respective drive wheels 100, therefore a single wheel drive of each of the drive wheels 100. Consequently, each of the drive wheels 100 can thus be driven independently of the other drive wheels 100 by way of the electric drive machine 10 respectively assigned thereto.

Figure 2:
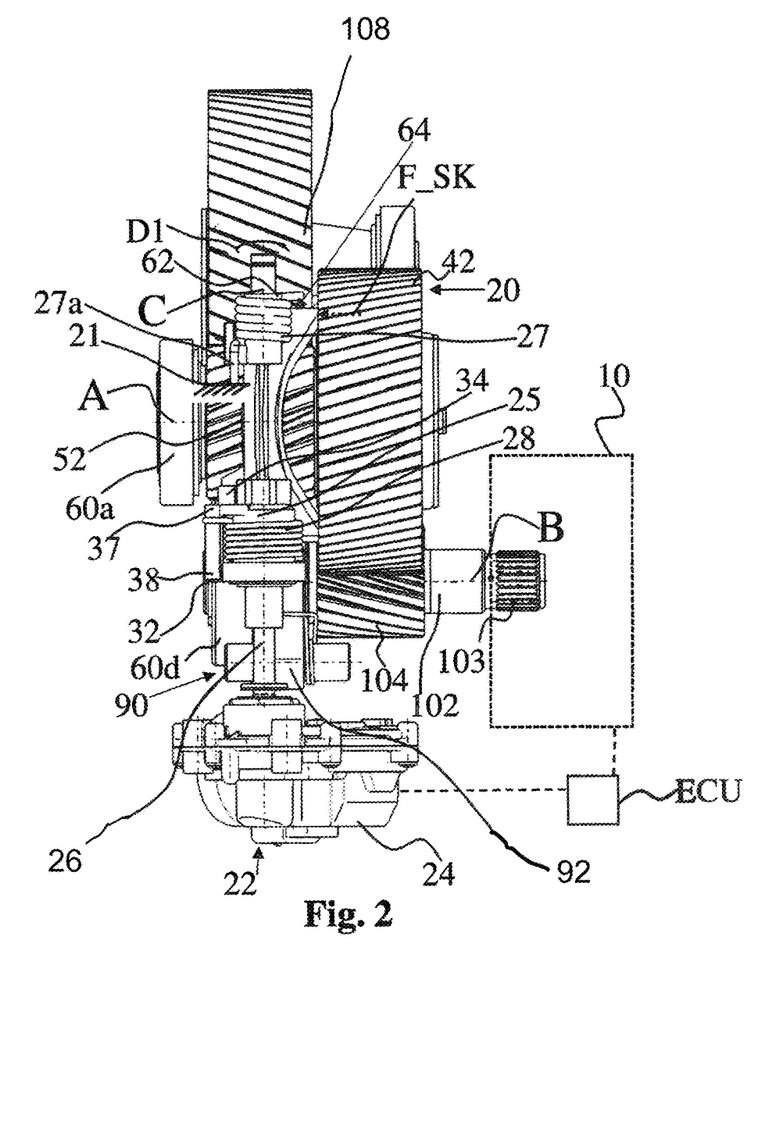
FIG. 2 shows a plan view of the coupling mechanism, the electric drive machine, the parking lock device, the clutch and the actuating device.

For reasons of clarity, FIG. 1 illustrates only one of the spur gear transmissions SG with one of the coupling mechanisms 20 and only one of the drive wheels 100. However, the statements below pertaining to the drive machine 10, to the spur gear transmission SG, to the coupling mechanism 20 and to the drive wheel 100 apply to all drive machines 10, spur gear transmissions SG, coupling mechanisms 20 and drive wheels 100 of the motor vehicle K. The drive machine is concealed in FIG. 1 and therefore cannot be seen, but is schematically illustrated in FIG. 2. Furthermore, FIG. 2 is a plan view showing the coupling mechanism 20 and thus a subregion of the spur gear transmission SG.

The spur gear transmission SG comprises a first transmission shaft 102, as can be seen in the plan view in FIG. 2. The transmission shaft 102 is coupled to the electric drive machine 10 of the motor vehicle K in a torque-transmitting manner. The torque-transmitting and thus rotationally fixed coupling between the first transmission shaft 102 and the drive machine 10 occurs here, merely by way of example, via a splined shaft end portion 103, that is to say in other words an end portion of the first transmission shaft 102 which has splines. The first transmission shaft 102 is in engagement with the electric drive machine 10 via these splines. A first transmission gear 104 is also coupled to the first transmission shaft 102 in a rotationally fixed manner. The first transmission gear 104 is in engagement with a first gear 42 of the coupling mechanism 20. Consequently, the first gear 42 of the coupling mechanism 20 is in indirect engagement with the drive machine 10, thus being indirectly coupled to the drive machine 10.

The spur gear transmission SG further comprises a second transmission shaft 106 which is coupled to the drive wheel 100 in a torque-transmitting manner. The first transmission shaft 102 and the second transmission shaft 106 can be coupled to one another in a torque-transmitting manner by way of the coupling mechanism 20 by setting the coupling position KS. For reasons of clarity, the coupling of the second transmission shaft 106 with the drive wheel 100 (which is shown only partially and in a greatly abstracted manner) is illustrated only in FIG. 1. The first transmission shaft 104 serves for input-side torque transmission, and the second transmission shaft 106 serves for output-side torque transmission. The torque-transmitting and thus rotationally fixed coupling between the second transmission shaft 106 (only shown as a shaft journal in FIG. 1) and the drive wheel 100 occurs here, merely by way of example, via an internal toothing 107 of the second transmission shaft 106 (which cannot be seen explicitly in FIG. 1, however). The drive wheel 100 is in engagement with the internal toothing 107 via a drive axle 110 (which is illustrated in dashed lines in FIG. 1) and thus coupled to the second transmission shaft 106 of the spur gear transmission SG in a rotationally fixed manner. It can also be seen from FIG. 1 that the coupling mechanism 20 is provided for torque-transmitting coupling to precisely one side of the drive axle 110 of the motor vehicle K, as a result of which a single wheel drive of the drive wheel 100 can occur. Here, the transmission of the torque between the electric drive machine 10 and the drive wheel 100 can occur without interposition of a differential gear mechanism. The transmission of the torque between the electric drive machine 10 and the drive wheel 100 can thus occur in a differential gear mechanism-free manner (without differential gear mechanism).

A second transmission gear 108 of the spur gear transmission SG is also coupled to the second transmission shaft 106 in a rotationally fixed manner. The second transmission gear 108 is in engagement with a second gear 52 of the coupling mechanism 20. Consequently, the second gear 52 of the coupling mechanism 20 is at least indirectly coupled to the drive wheel 100 in a rotationally fixed manner.

For reasons of clarity, respective gear teeth, for example of the (first and second) transmission gears 104, 108 and of the (first and second) gears 42, 52, are not illustrated in FIG. 1.

Figure 5:
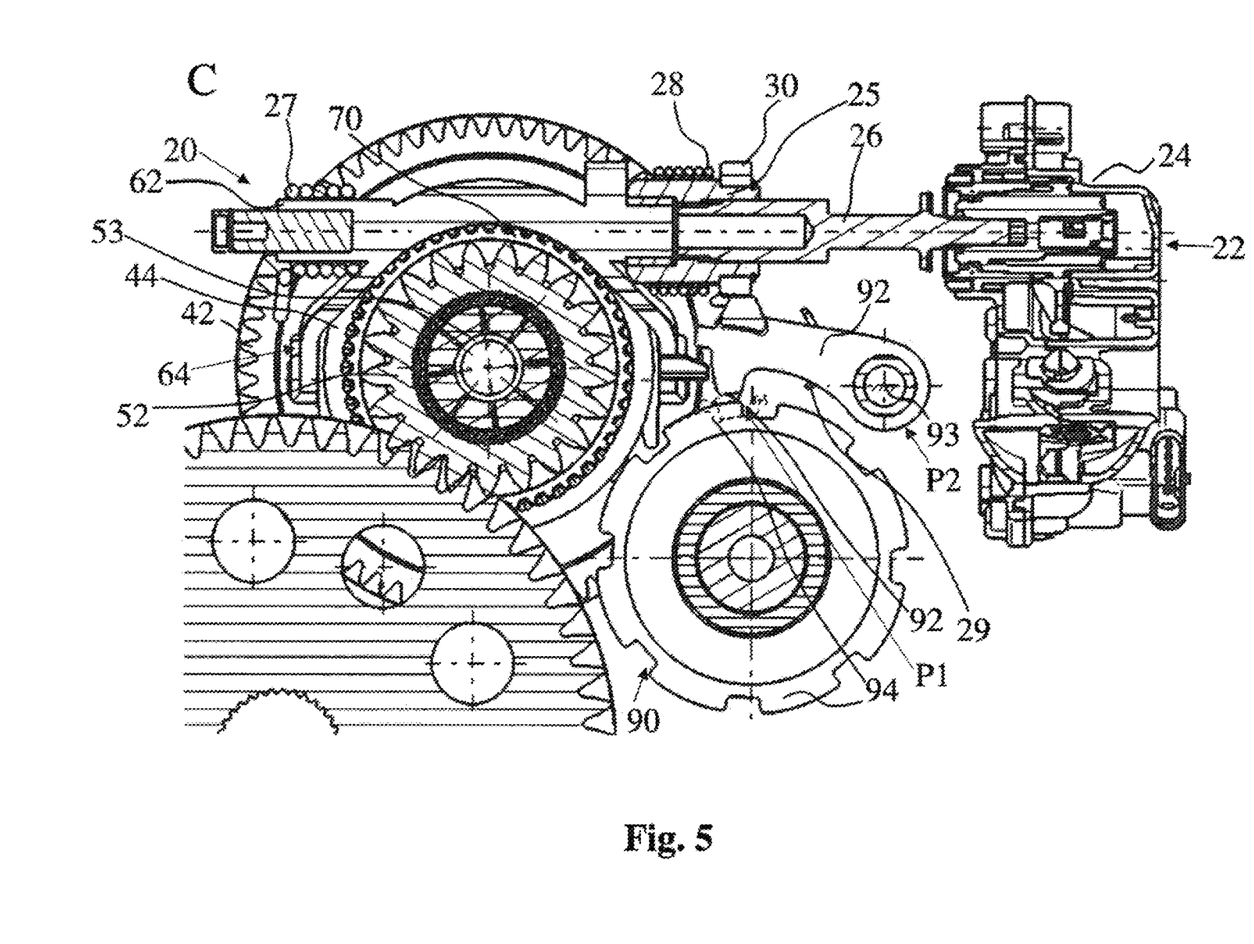

The motor vehicle K additionally comprises a parking lock device 90 which comprises a parking lock element 92. In the present case, the parking lock element 92 takes the form of a pawl. The parking lock element 92 can be displaced between a parking lock position P1, in which the parking lock element 92 is in engagement with a parking lock wheel 94 of the parking lock device 90 and thereby blocks a rotation of the drive wheel 100, and an unlocking position P2, as can be seen from FIG. 5. In FIG. 5, the parking lock position P1 is schematically illustrated by dashed representation of subregions of the parking lock wheel 94 and of the parking lock element 92. In the unlocking position P2, which can be seen for example in FIG. 1, the parking lock element 92 is not in engagement with the parking lock wheel 94, as a result of which the rotation of the drive wheel 100 is released, that is to say not blocked by the parking lock device 90. It can be seen from FIG. 2 for example that the parking lock wheel 94 is coupled in a rotationally fixed manner to the first transmission shaft 102 and to the first transmission gear 104 and the electric drive machine 10. As can be seen from FIG. 5, the parking lock element 92 can be rotatably mounted via a parking lock element bearing 93 on a housing (not shown further presently), for example the housing of the spur gear transmission SG, and can be displaced between the parking lock position P1 and the unlocking position P2 by a pivoting movement of the parking lock element 92 about the parking lock element bearing 93.

Figure 3:
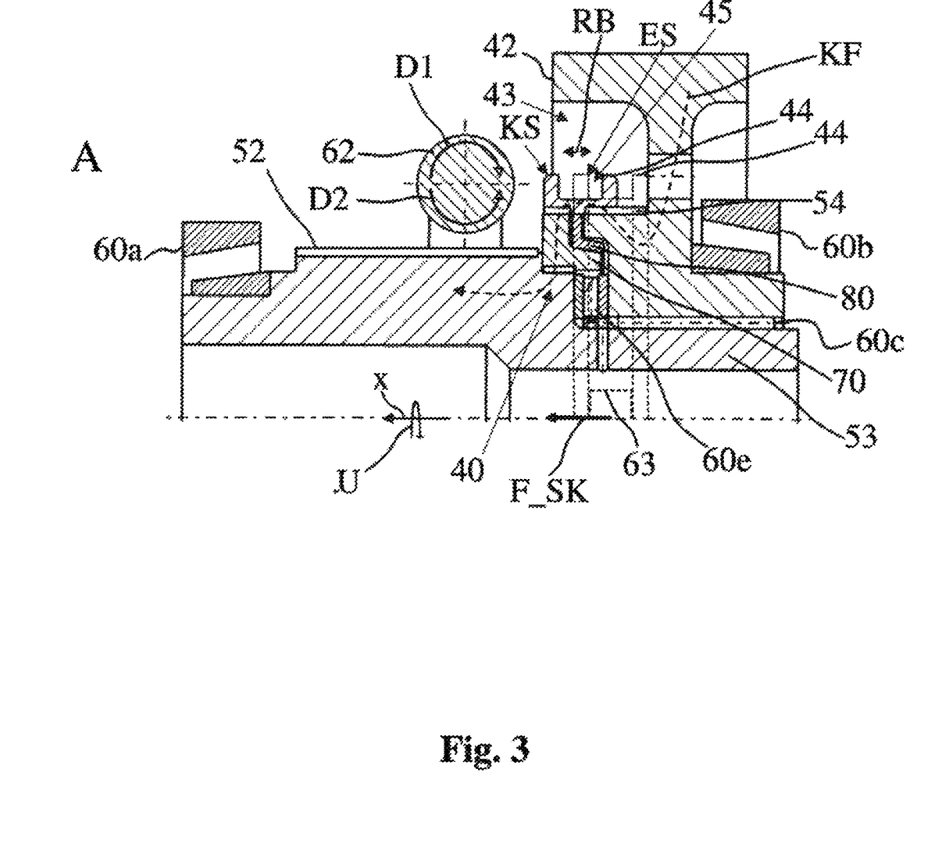
FIG. 3 shows a sectional illustration in a section plane A shown in FIG. 2.
Figure 4:
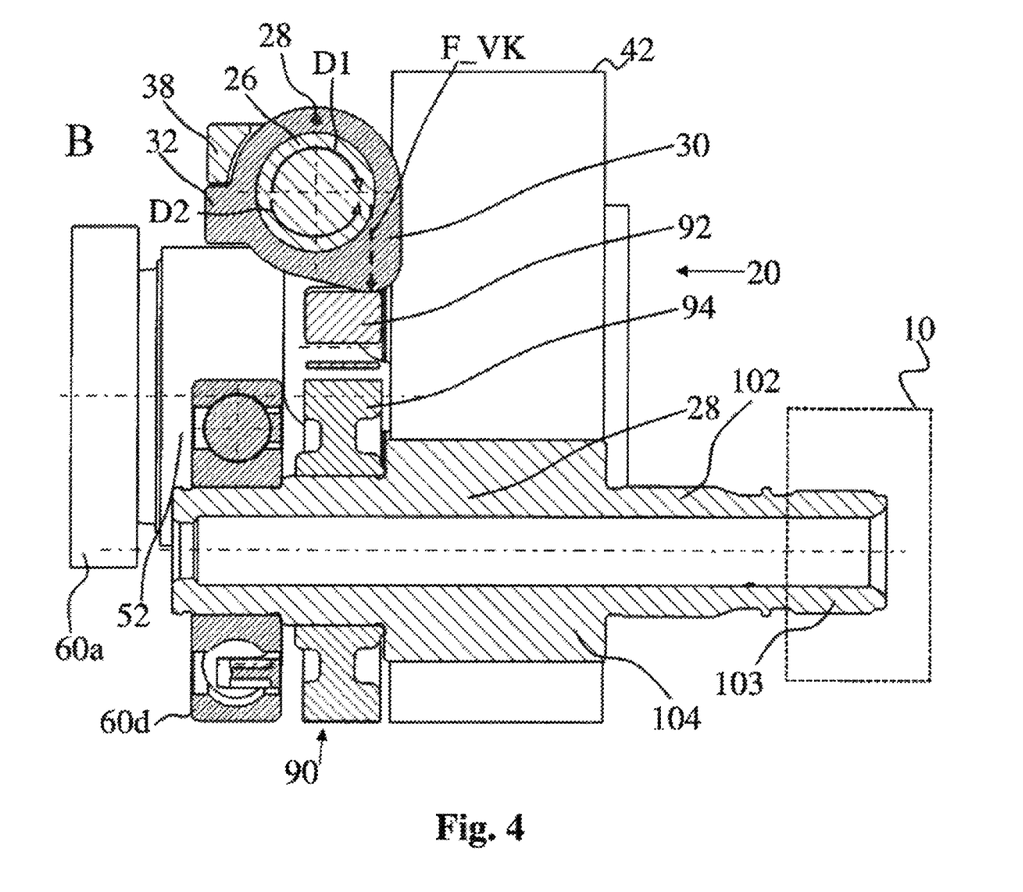
FIG. 4 shows a further sectional illustration in a section plane B shown in FIG. 2; and, FIG. 5 shows a further sectional illustration in a section plane C shown in FIG. 2.

For mounting the coupling mechanism 20 in this housing, use can be made, for example, of a plurality of rolling bearings 60a, 60b, as can be seen from FIG. 3. However, it is clear that still further bearings can be provided. In the present case, the rolling bearings 60a, 60b are formed as adjusted cylinder roller bearings, wherein the rolling bearing 60a serves for rotatably mounting the second gear 52 on the housing, and the rolling bearing 60b serves for rotatably mounting the first gear 42 on the housing. The first gear 42 is rotatably mounted and supported on a shaft 53 of the second gear 52 via a further rolling bearing 60c (see FIG. 3), which in the present case takes the form of a needle bearing, for example. Furthermore, the two gears 42, 52 are supported with respect to one another via a further rolling bearing 60e, namely an axial needle bearing, in the axial direction of extent and thus in the direction of an axis of rotation x. FIG. 4 shows that the first transmission shaft 102 and thus the first transmission gear 104 are supported on the housing (not shown further) via a further rolling bearing 60d, which in the present case takes the form of a ball bearing, for example.

The motor vehicle K further comprises an actuating device 22 with an actuator 24. The actuator 24 is designed, on the one hand, to actuate a clutch 40 of the coupling mechanism 20, which clutch has at least one switching element 62 and serves for switching between the coupling position KS and the decoupling position ES. On the other hand, the actuator 24 also serves for displacing the parking lock element 92 between the parking lock position P1 and the unlocking position P2. The switching element 62 takes the form of a switching rocker or switching fork, for example, as can be seen from FIG. 1.

In the present case, the clutch 40 takes the form of a positive clutch, namely a claw clutch. The motor vehicle K comprises a control unit ECU by way of which the actuating device 22 and the electric drive machine 10 can be controlled, as schematically illustrated in FIG. 2. The control unit ECU may comprise a controller, such as a processor, microcontroller, or microprocessor, and may be configured to execute software, programs, and/or logic stored in an memory with the control unit ECU, such as ROM, RAM, PROM, and/or EEPROM, The design of the clutch 40 can be seen from a combination of FIG. 1 with the sectional illustration in FIG. 3. The clutch 40 comprises a first clutch element 44 which is at least indirectly coupled in a rotationally fixed manner to the first gear 42, namely by way of a second clutch element 54 of the clutch 40. The second clutch element 54 can be formed as a fixed socket which can be coupled to the first gear 42 in a rotationally fixed manner. However, in the present case, the second clutch element 54 is formed as toothing which is arranged in a gear recess 43 of the first gear 42, is connected in one piece to the first gear 42 and is thus coupled to the first gear 42 in a rotationally fixed manner. Although the first clutch element 44 is coupled to the first gear 42 in a rotationally fixed manner by way of the second clutch element 54, it is possible, by virtue of the toothing, to have a relative axial displacement between the first clutch element 44 and the second clutch element 54 parallel to the axis of rotation x about which, during operation of the motor vehicle K, the gears 42, 52 can rotate for example in a circumferential direction U illustrated by an arrow.

Furthermore, the clutch 40 comprises a connecting element 70 which, on the one hand, is directly coupled to the second gear 52 and, on the other hand, can be directly coupled in a rotationally fixed manner to the first clutch element 44 in that the first clutch element 44 is switched from the decoupling position ES into the coupling position KS. In the present case, the connecting element 70 is, on the one hand, in engagement with the first clutch element 44 and, on the other hand, with the second gear 52 via respective spline toothings which are not designated in further detail. The connecting element 70 can be formed in particular as a fixed socket, as can be seen from FIG. 3. To set the coupling position KS, the first clutch element 44 is brought into engagement with the connecting element 70, as shown in FIG. 3.

To prevent the switching from the decoupling position ES into the coupling position KS when there is a rotational speed difference between the first gear 42 and the second gear 52, the clutch 40 comprises a locking element 80. The locking element 80 serves to release a relative movement RB, which brings about the switching from the decoupling position ES into the coupling position KS, between the first clutch element 44 and the second clutch element 54 when there is rotational speed parity between the first gear 42 and the second gear 52. In the case of rotational speed parity, the locking element 80 thus allows the movement of the first clutch element 44 and hence the switching from the decoupling position ES into the coupling position KS, wherein, in the coupling position KS, the force flow KF can be guided via the first gear 42, the second clutch element 54, the first clutch element 44, the connecting element 70 and the second gear 52.

When there is rotational speed parity, produced by way of the electric drive machine 10, between the first gear 42 and the second gear 52, the locking element 80 thus releases overall the relative movement RB, which brings about the switching from the decoupling position ES into the coupling position KS, between the first clutch element 44 and the second clutch element 54.

FIG. 3 shows the respective position of the first clutch element 44 for illustration both in the coupling position KS and in the decoupling position ES (dashed lines). It is advantageous here if, in addition to the second clutch element 54 and the locking element 80, which are each completely arranged in the gear recess 43, the first clutch element 44 and the connecting element 70 are also arranged at least partially, preferably completely, in the gear recess 43. The force flow KF between the first gear 42 and the second gear 52 occurs in a particularly small installation space and thus extends over a particularly short path if the first clutch element 44 is arranged in the gear recess 43 not only in the decoupling position ES but also in the coupling position KS.

The switching element 62 serves for setting the coupling position KS and the decoupling position ES. The switching element 62 comprises a first element arm portion 64 and a second element arm portion 66 which is directly connected to the first element arm portion 64 and encloses an angle with the first element arm portion 64. The first element arm portion 64 and the second element arm portion 66 together form an L shape, by way of which particularly space-saving and fault-free switching is made possible. A combination of FIG. 1 with FIG. 3 reveals that the switching element 62 is rotatably coupled to the first clutch element 44 via the second element arm portion 66. The switching element 62 can have, in particular on the second element arm portion 66, an engagement element 63, for example a sliding block, or an engagement region which is inserted into an engagement groove 45 of the first clutch element 44 that extends at least in certain regions in the circumferential direction U. The engagement element 63 can be seen in FIG. 1 and is schematically shown in FIG. 3.

If the switching element 62 is rotated by the actuator 24, the switching element arm portions 64, 66 can be pivoted and thus there can be brought about a displacement of the first clutch element 44 between the coupling position KS and the decoupling position ES.

The actuating device 22 comprises an actuating element 26 which can be adjusted by way of the actuator 24 and which is designed, on the one hand, to exert a switching force F_SK on the switching element 62 to actuate the clutch 40 and, on the other hand, to exert a displacing force F_VK, for displacing the parking lock element 92 between the parking lock position P1 and the unlocking position P2. The actuating element 26 is shown for example in FIG. 1 and in sectional illustration in FIG. 5. The actuating element 26 can preferably be formed as a shaft. This shaft can be connected to a rotor shaft of the actuator 24 in a rotationally fixed manner. Alternatively, the actuating element 26 can also be formed as a rotor shaft of the actuator 24.

It can be seen from FIG. 5 that the switching element 62 is inserted into an adapter shaft 25 and can be rotatably mounted there. The actuating element 26 is also inserted into the adapter shaft 26. By contrast with the switching element 62, in the present case the actuating element 26 is connected to the adapter shaft 25 in a rotationally fixed manner. The adapter shaft 25, which is also shown in FIG. 1 and FIG. 2, is in the present case configured as a hollow shaft, as can also be seen in FIG. 5. The actuating element 26 is directly coupled to the switching element 62 of the clutch 40 in a force-transmitting manner via a first spring element 27 of the actuating device 22 that takes the form of a torsion spring and in the present case is mounted on the adapter shaft 25. The switching element 62 is preloaded by spring force on a housing 21 of the coupling mechanism 20 via the first spring element 27. Since the actuating element 26 is coupled to the switching element 62 in a torque-transmitting manner in a second direction of rotation D2, overall the actuating element 26 is also supported on the housing 21 with spring force preloading at least indirectly, namely via the switching element 62 and the first spring element 27. For reasons of clarity, the housing 21 of the coupling mechanism 20 is shown only in FIG. 1 and FIG. 2 and is illustrated there only in a highly abstract and schematic manner. FIG. 1 and FIG. 2 show that a spring element region 27a, which preferably takes the form of a spring leg, of the first spring element 27 is supported on the housing 21.

It can also be seen in FIG. 5 that the actuating element 26 is directly coupled to an eccentric element 30 of the actuating device 30 in a force-transmitting manner via a second spring element 28, which is likewise formed as a torsion spring, of the actuating device 22, by way of which eccentric element the parking lock element 92 can be displaced between the parking lock position P1 and the unlocking position P2. In the present case, the eccentric element 30 is formed as a cam, as can be seen from FIG. 4. Alternatively, the eccentric element 30 could also be formed as an eccentrically mounted circular disk, although this is not shown further in the present case.

The actuating element 26 can generally be rotated in a direction of rotation D1 by operating the actuator 24, as a result of which both the switching force F_SK can be exerted on the switching element 62 via the first spring element 27 and the displacing force F_VK can be exerted on the eccentric element 30 via the second spring element 28.

In FIG. 1, the actuating device 22 maintains a drive switching state in which the coupling position KS is switched and at the same time the parking lock element 92 is held displaced in the unlocking position P2. In the drive switching state, the driving of the motor vehicle K is ensured by coupling the electric drive machine 10 to the drive wheel 100 via the coupling mechanism 20 and at the same time the parking lock element 92 is open and thus held in the unlocking position ES.

In a likewise switchable release state, the motor vehicle K can operate, for example, in a so-called coasting mode, that is to say a so-called coasting of the motor vehicle K can be made possible in which the motor vehicle K is moved without the respective electric drive machines 10 driving the respective drive wheels 100 and without the respective parking lock device 90 blocking the movement of the motor vehicle K, in particular the rolling of the respective drive wheels 100. In the release state, the decoupling position ES is switched and at the same time the parking lock element 92 is held displaced in the unlocking position P2.

The parking lock element 92 rotatably mounted on the housing is pressed against the eccentric element 30 counter to gravitational force and held there in the unlocking position P2 by way of a third spring element 29 which is assigned for example to the actuating device 22 and which, just like the first spring element 27 and the second spring element 28, is formed as a torsion spring.

In the release state, an eccentric element-side stop 32, which is formed as a projection and can also be referred to as a stop assigned to the eccentric element 30, bears against an eccentric element stop 38. In the present case, the eccentric element stop 38 assigned to the actuating element 26 is also formed as a projection, as can be seen particularly clearly in FIG. 4 and also in FIG. 2. Moreover, in the release state, a switching element-side stop 34, which is formed as a projection and can also be referred to as a stop assigned to the switching element 62, bears against a switching element stop 37 of the actuating element 26. In the present case, the switching element stop 37 assigned to the actuating element 26 is also formed as a projection, as can be seen from FIG. 1 and FIG. 2.

The switching element stop 37 makes it possible for a movement, in particular a rotation, of the switching element 62 relative to the actuating element 26 to be limited. The eccentric element stop 38 makes it possible for a movement, in particular a rotation, of the eccentric element 30, which is rotatably mounted on the actuating element 26, relative to the actuating element 26 to be limited.

It is also possible by way of the actuating device 22 to set the drive switching state in which, as stated, the coupling position KS is switched and at the same time the parking lock element 92 is held displaced in the unlocking position P2. In the drive switching state, the drive wheel 100 is thus coupled to the electric drive machine 10 via the spur gear transmission SG and hence also the coupling mechanism 20 and the parking lock device 90 is open, with the result that the drive wheel 100 can be driven by the electric drive machine 10 without the parking lock device 90 blocking the driving of the drive wheel 100.

In order to set the drive switching state, the actuating element 26 can be rotated by way of the actuator 24 corresponding to the direction of rotation D1 (here: in the clockwise direction) illustrated by an arrow in FIG. 2 and in FIG. 3. If there is no rotational speed parity between the gears 42, 52, the locking element 80 prevents the switching from the decoupling position ES into the coupling position KS and thus the corresponding relative movement RB of the first clutch element 44 by way of the switching element 62.

The rotation of the actuating element 26 in the direction of rotation D1 preloads the first spring element 27 via which the switching element 62 and the actuating element 26 are coupled to one another in a force-transmitting manner. For this purpose, the actuator 24 exerts a torque by way of which the first spring element 27 is mechanically preloaded and as a result the switching force F_SK is stored in the first spring element 27 as long as the locking element 80 prevents the coupling of the first clutch element 44 to the connecting element 70 and thus the setting of the coupling position KS. Here, the first clutch element 44 is pressed as it were by the switching force F_SK in the direction of the locking element 80 by way of the first spring element 27 via the switching element 62 and the engagement element 63 arranged in the engagement groove 45. The locking element 80 prevents the coupling of the first clutch element 44 to the connecting element 70 as long as the rotational speed difference between the first gear 42 and the second gear 52 prevails. As soon as the electric drive machine 10 has compensated for the rotational speed difference and there is thus rotational speed parity between the two gears 42, 52, the locking element 80 allows the coupling of the first clutch element 44 to the connecting element 70 and thus the setting of the coupling position KS. Consequently, the first clutch element 44 is moved by the exertion of the switching force F_SK in the direction of the connecting element 70, and the first clutch element 44 is brought into engagement with the connecting element 70, as a result of which the coupling position KS is set. It is clear that, for example, during an acceleration of the motor vehicle K from standstill, rotational speed parity can prevail even without interventions of the electric drive machine 10, which accordingly means that there is no need for an intervention of the electric drive machine 10 since, in this case, there is no rotational speed difference.

Likewise, the rotation of the actuating element 26 in the direction of rotation D1 also preloads the second spring element 28 via which the eccentric element 30 and the actuating element 26 are coupled to one another in a force-transmitting manner. The torque exerted by way of the actuator 24 allows the second spring element 28 to be mechanically preloaded and thus the displacing force F_VK to be stored in the second spring element 28 if the displacement of the parking lock element 92 from the unlocking position P2 into the parking lock position P1 is mechanically prevented. For example, the displacement from the unlocking position P2 into the parking lock position P1 can be mechanically prevented if the parking lock element 92 and the parking lock wheel 94 are oriented with respect to one another as shown in FIG. 1, that is to say if the parking lock element 92 cannot engage in the parking lock element 94. If a rotational speed of the first transmission shaft 102 falls below a predetermined rotational speed limit value, that is to say the rotational speed of the first transmission shaft is sufficiently low, which can be the case, for example, at a driving speed of the motor vehicle K of less than 5 km/h, the parking lock element 92 (here: pawl) can be brought into engagement with the parking lock wheel 94, that is to say the parking lock element 92 can be displaced from the unlocking position P2 into the parking lock position P1. For this purpose, the eccentric element 30 is rotated in the (first) direction of rotation D1 by the displacing force F_VK stored in the second spring element 28 and presses the parking lock element 92 into a position in which the parking lock element 92 latches with the parking lock wheel 94 and thus the parking lock position P1 is set. In this case, then, both the coupling position KS is switched and at the same time the parking lock element 92 is held displaced in the parking lock position P1, with the result that a blocking switching state is set. The motor vehicle K can thus then be held at a standstill by way of the parking lock device 90.

During the operation of the motor vehicle K, it is thus generally possible, by way of the actuating device 22, for the first spring element 27 with the switching force F_SK and additionally, in particular at the same time, for the second spring element 28 with the displacing force F_VK to be held in a respectively preloaded state. As soon as the rotational speed parity between the two gears 42, 52 prevails, that is to say the two gears 42, 52 each have the same rotational speed (gear rotational speed), the first clutch element 44 can be moved and switched from the decoupling position ES into the coupling position KS via the first spring element 27, in particular through at least partial relaxation of the first spring element 27 and resultant pivoting of the element arm portions 64, 66. As soon as the driving speed of the motor vehicle K is sufficiently low, it is possible, via the second spring element 28, in particular through at least partial relaxation of the second spring element 28, for the parking lock element 92 to be moved by way of the eccentric element 30 counter to a spring force of the third spring element 29 and moved from the unlocking position P2 into the parking lock position P1.

In order to set the release state in turn, the actuating element 26 can be rotated by operation of the actuator 24 in the second direction of rotation D2 opposite to the first direction of rotation D1. To set the release state starting from the drive switching state and/or from the blocking switching state, the switching element stop 37 and the switching element-side stop 34 and/or the eccentric element stop 38 and the eccentric element-side stop 32 are particularly useful, since the respective mutually corresponding stops 37, 34 or 38, 32 allow reliable resetting of the switching element 62 and/or of the eccentric element 30 and thus the reliable setting of the decoupling position ES and the unlocking position PS.

A key advantage of the motor vehicle K is that, by virtue of the arrangement described, an undesired switching state in which the parking lock position P1 and at the same time the decoupling position ES are set can be reliably ruled out. Consequently, the motor vehicle K has a particularly high degree of operational reliability.

A key advantage of the switching element 62 preloaded by spring force on the housing 21 of the coupling mechanism 20 is that the switching element 62 (here: switching rocker) can already be supported in the decoupling position ES on the housing 21 with spring force preloading via the first spring element 27, preferably can be supported with maximum preloading. The first spring element 27 can, upon relaxing, support the movement of the switching element 62 and thus considerably accelerate the switching from the decoupling position ES into the coupling position KS, as a result of which a particularly low-delay switching is made possible and a particularly high switching speed can be achieved. By virtue of the movement from the coupling position KS into the decoupling position ES, that is to say as a result of the rotation in the second direction of rotation D2 by way of the actuator 24, not only can the decoupling position ES and the unlocking position PS be set, but also the first spring element 27 can be tensioned with an increase in the spring force preloading.

It is also conceivable that the actuator 24 exclusively enables the relaxing of the first spring element 27, with the result that the switching from the decoupling position ES into the coupling position KS can occur exclusively by way of the first spring element 27, that is to say by relaxing of the first spring element 27. As a result, the actuator 24 can be operated in a particularly gentle manner, especially since the actuator 24 then does not have to bring about strong acceleration of the switching element 62 for its movement, but the acceleration can occur exclusively by way of the first spring element 27 preloaded on the housing 21. The relaxing of the first spring element 27 preloaded on the housing 21 can additionally result in particularly quick switching from the decoupling position ES into the coupling position KS, in particular even before the drive machine 10 has reached a desired target rotational speed.

LIST OF REFERENCE SIGNS

10 Drive machine
20 Coupling mechanism
21 Housing
22 Actuating device
24 Actuator
25 Adapter shaft
26 Actuating element
27 First spring element
27a Spring element region
28 Second spring element
29 Third spring element
30 Eccentric element
32 Eccentric element-side stop
34 Switching element-side stop
37 Switching element stop
38 Eccentric element stop
40 Clutch
42 First gear
43 Gear recess
44 First clutch element
45 Engagement groove
52 Second gear
53 Shaft
54 Second clutch element
60 a-e Rolling bearing
62 Switching element
63 Engagement element
64 First element arm portion
66 Second element arm portion
70 Connecting element
80 Locking element
90 Parking lock device
92 Parking lock element
93 Parking lock element bearing
94 Parking lock wheel
100 Drive wheel
102 First transmission shaft
103 Splined shaft end portion
104 First transmission gear
106 Second transmission shaft
107 Internal toothing
108 Second transmission gear
110 Drive axle
D1 (First) direction of rotation
D2 (Second) direction of rotation
ECU Control unit
F_SK Switching force
F_VK Displacing force K Motor vehicle
KF Force flow
KS Coupling position
ES Decoupling position
P1 Parking lock position
P2 Unlocking position
RB Relative movement
SG Spur gear transmission
U Circumferential direction
x Axis of rotation

What is claimed is:

1. A motor vehicle comprising:
at least one electric drive machine for driving the motor vehicle,
at least one coupling mechanism switchable at least between a coupling position, in which the electric drive machine is coupled to a drive wheel of the motor vehicle in a torque-transmitting manner, and a decoupling position, in which the electric drive machine is decoupled from the drive wheel,
a parking lock device comprising at least one parking lock element movable between a parking lock position, in which the at least one parking lock element at least indirectly blocks a rotation of the drive wheel, and an unlocking position, in which the at least one parking lock element releases rotation of the drive wheel, and
at least one actuating device with an actuator configured to actuate a clutch that switches the coupling mechanism between the coupling position and the decoupling position, and to displace the at least one parking lock element between the parking lock position and the unlocking position,
wherein the clutch has at least one switching element, preloaded by spring force on a housing of the coupling mechanism, and serves for switching between the coupling position and the decoupling position,
wherein the at least one actuating device comprises an actuating element which can be adjusted by way of the actuator and which is configured, on the one hand, to exert at least one switching force on the switching element for actuating the clutch and, on the other hand, to exert at least one moving force, for moving the at least one parking lock element between the parking lock position and the unlocking position, and
wherein the actuating element is at least indirectly coupled to an eccentric element of the actuating device in a force-transmitting manner via a second spring element of the actuating device, by way of which eccentric element the parking lock element can be displaced between the parking lock position and the unlocking position.

2. The motor vehicle according to claim 1, wherein:
the actuating device is configured to set a release state in which the decoupling position is switched and at the same time the parking lock element is held displaced in the unlocking position.

3. The motor vehicle according to claim 1, wherein:
the actuating device is configured to set a drive switching state in which the coupling position is switched and at the same time the parking lock element is held displaced in the unlocking position.

4. The motor vehicle according to claim 1, wherein
the actuating device is configured to set a blocking switching state in which the coupling position is switched and at the same time the parking lock element is held displaced in the parking lock position.

5. The motor vehicle according to claim 1, wherein:
the actuating element is preloaded by spring force on the housing of the coupling mechanism via a first spring element of the actuating device and at least indirectly coupled to the at least one switching element of the clutch in a force-transmitting manner.

6. The motor vehicle according to claim 1, wherein:
the actuating element can be rotated in a direction of rotation by way of the actuator, as a result of which both the at least one switching force can be exerted on the switching element via the first spring element and the at least one displacing force can be exerted on the eccentric element via the second spring element.

7. The motor vehicle according to claim 1, wherein:
the actuating element has a switching element stop, by way of which a movement of the switching element relative to the actuating element can be limited, and/or the actuating element has an eccentric element stop, by way of which a movement of the eccentric element relative to the actuating element can be limited.

8. The motor vehicle according claim 1, wherein:
the coupling mechanism comprises a first gear, which is in at least indirect engagement with the drive machine, and a second gear which can be coupled to the first gear by way of the clutch in a torque-transmitting manner and which is at least indirectly coupled to the drive wheel in a rotationally fixed manner,
the clutch comprises a first clutch element which is at least indirectly coupled to the first gear in a rotationally fixed manner via a second clutch element of the clutch which is connected to the first gear in a rotationally fixed manner, and
the clutch comprises a connecting element which, on the one hand, is at least indirectly coupled to the second gear and, on the other hand, can be at least indirectly coupled to the first clutch element in a rotationally fixed manner.

9. The motor vehicle according to claim 8, wherein
the clutch comprises a locking element for preventing the switching from the decoupling position into the coupling position when there is a rotational speed difference between the first gear and the second gear, and for releasing a relative movement, which brings about the switching from the decoupling position into the coupling position, between the first clutch element and the second clutch element when there is rotational speed parity between the first gear and the second gear.

10. The motor vehicle according to claim 8, wherein:
in the coupling position and/or in the decoupling position, the switching element is inserted, in at least certain regions, into a gear recess arranged radially within a toothing of at least one of the gears and is in engagement with the first clutch element.

11. The motor vehicle according to claim 1, wherein:
the switching element comprises a switching rocker or a switching fork.

* * * * *